United States Patent

Bouchard et al.

Patent Number: 5,293,714
Date of Patent: Mar. 15, 1994

[54] METHOD AND APPARATUS FOR CLEANING SOD

[76] Inventors: Brian L. Bouchard, 890 Usquepaugh Rd.; Darrell H. Bouchard, 20 Knowles La., both of West Kingston, R.I. 02892

[21] Appl. No.: 877,735
[22] Filed: May 4, 1992
[51] Int. Cl.$^5$ .................................. A01C 1/04
[52] U.S. Cl. .................................. 47/56; 47/1.01
[58] Field of Search .................. 47/56, 1.01; 15/308, 15/256.5; 209/7, 241, 308

[56] References Cited

U.S. PATENT DOCUMENTS

| | | | |
|---|---|---|---|
| 2,629,343 | 2/1953 | Rose | 15/308 |
| 2,660,835 | 12/1953 | Burden | 209/241 |
| 3,269,532 | 8/1966 | Moore | 209/241 |
| 3,583,555 | 6/1971 | Karsnak et al. | 15/256.5 |
| 3,983,888 | 10/1976 | Edwards | 15/256.5 |
| 4,240,902 | 2/1980 | Agee et al. | 209/241 |
| 4,289,614 | 9/1981 | Suzuki | 209/308 |
| 4,911,827 | 3/1990 | Ryan et al. | 209/308 |

FOREIGN PATENT DOCUMENTS 2599221 12/1987 France .................... 15/256.5

Primary Examiner—Ramon S. Britts
Assistant Examiner—Joanne C. Downs
Attorney, Agent, or Firm—Patrick J. Pinto

[57] ABSTRACT

A method and apparatus for cleaning sod being transported on a perforate conveyor belt which includes at least one vibratory position and a powered brush position for removing the earth from the sod. This method and apparatus may be attached to a farm vehicle at the sod harvesting site or free-standing at a remote location. This present invention removes the earth in a substantially dry condition so that the earth may be returned directly to the harvest site or conveyed to another location. A subsequent water bath stage is disclosed for the removal of unwanted dust on the sod.

21 Claims, 3 Drawing Sheets

METHOD AND APPARATUS FOR CLEANING SOD

BACKGROUND OF THE INVENTION

1. Field of the Invention

With regard to the classification of art, this invention is believed to be found in the general class entitled "Plant Husbandry" and more particularly to the subclasses pertaining to the cleaning of dirt from an elongated mat of grass or sod.

2. Description of the Prior Art

The cleaning of dirt from sod is known. As early as 1960, sod was washed at the site of installation to remove the dirt from the mat of grass. Subsequently U.S. Pat. No. 4,063,384, issued to Warren et al on Dec. 20, 1977 also disclosed the cleaning of sod by washing. It can easily be recognized that methods and apparatus which wash the sod by spraying, consume a large amount of water. Another problem associated with cleaning sod by washing is that the resultant washed dirt or mud must be dried before further processing or handling is practical.

It has been determined that an alternate system for cleaning sod is needed. This alternate system should provide a length of sod which is substantially soil or dirt free. The alternate system should also keep the removed dirt in a substantially dry state. This alternate system should also be capable of being used at the sod harvesting site as well as at a processing facility remote from the harvesting site.

The present invention solves the need to provide such an alternate system for cleaning of the sod. The present invention also provides an apparatus which may be used in a processing facility or it may be mounted to or trailed by a farm vehicle such as a tractor.

SUMMARY OF THE INVENTION

It is an object of this invention to provide and it does provide a sod cleaner which removes substantially all the dirt from sod while maintaining the removed dirt in a substantially dry condition.

It is also an object of this invention to provide and it does provide a sod cleaner which utilizes a vibrator to remove the dirt.

It is another object of this invention to provide and it does provide a sod cleaner which may be adapted for mobile use as well as fixed installation.

It is still another object of this invention to provide and it does provide a sod cleaner which incorporates a brush assembly to act as one of the dirt removing stages.

In addition to the above summary, the following disclosure is detailed to insure adequacy and aid in the understanding of this invention. This disclosure, however, is not intended to cover each new and inventive concept, no matter how it may be disguised either by variations in form or additions by further improvements. For this reason, there has been chosen specific embodiments of a sod cleaner. The principles used in this sod cleaner may be employed at the immediate sod harvesting site or at a remote processing facility. These specific embodiments have been chosen for the purpose of illustration and description as shown in the accompanying drawings wherein:

Figure 1:
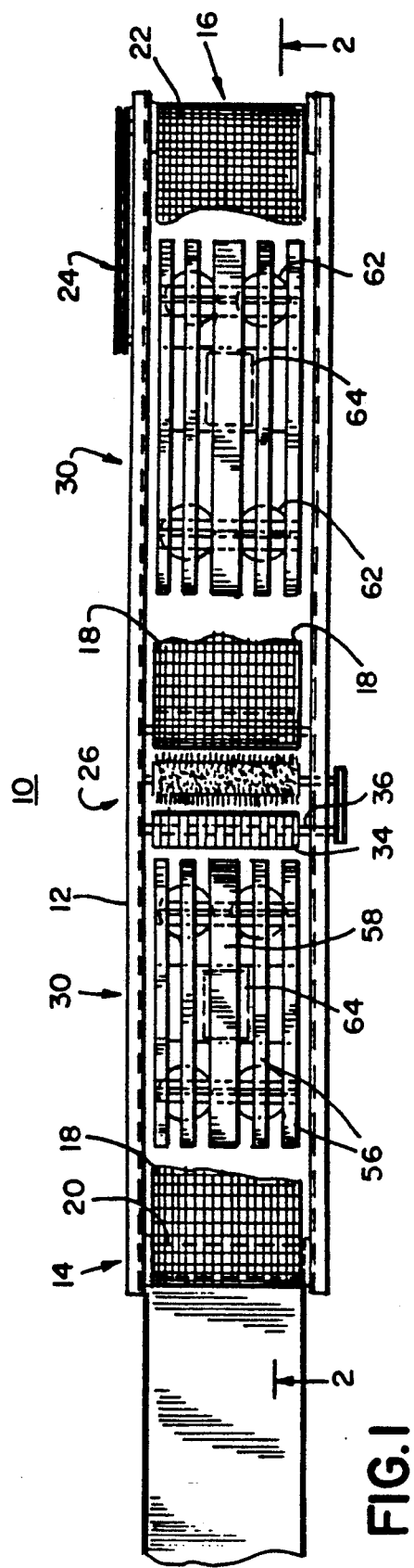
FIG. 1 represent a plan view, partly schematic, of the present invention.

In the following description and in the claims, various details are identified by specific names for convenience while differentiating between the various components. These names are intended to be generic in their application. Corresponding reference characters refer to like members throughout the several figures of the drawings.

The drawings accompanying and forming a part of this specification disclose details of construction for the sole purpose of explanation. It is to be understood that structural details may be modified without departing from the concept and principles of the invention. This invention may be incorporated in other structural forms, than shown.

EMBODIMENT OF FIG. 1

FIG. 1 represents a plan view of a sod cleaning apparatus, generally identified as 10. This sod cleaning apparatus 10 includes an elongated rigid frame 12 adapted for supporting the various operating components. This frame 12 has a feeding end 14 and a discharging end 16. A conveyor belt 18 is endlessly carried on the frame 12 by way of pulleys 20 and 22. Pulleys 20 and 22 are rotatably journaled in the frame 12 to allow a substantially continuous movement of the conveyor belt 18 as and when desired. A drive means 24 is mounted on the frame 12 to provide the continuous powered operation of the conveyor belt 18. This drive means 24 preferably allows variable speed control of the conveyor belt 18 within the range of 5 to 50 feet per min.

Figure 4:
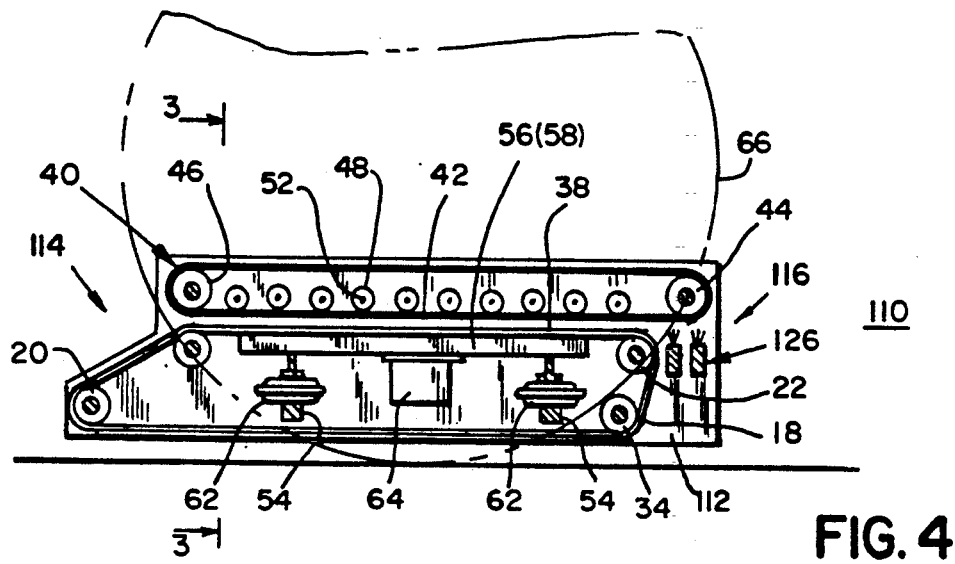
FIG. 4 is a sectional view of the mobile mounting of the present invention, this view being partly schematic and showing the present invention being carried by a tractor.

A brush assembly, generally identified as 26 is also mounted on and to the frame 12. This brush assembly 26 preferably is mounted intermediate the feeding end 14 and the discharging end 16. The preferred arrangement provides a three stage cleaning of the sod. The brush assembly 26 may be of a rotary design, as shown in FIG. 1 or of a transversely reciprocating type as seen in FIG. 4. The brush assembly 26 may also be mounted at the feeding end 14 or the discharging end 16. The location of the brush assembly 26 will be discussed later.

The conveyor belt 18 preferably is perforated to allow loosened dirt, earth, or soil to pass therethrough. This conveyor belt 18 is supported by at least one conveyor belt support assembly 30. Each of the conveyor belt support assemblies 30 is suspended on the frame 12 to allow vibratory motion. The components of the conveyor belt assembly 30 will be discussed later in connection with the description of FIG. 3. Preferably this conveyor belt 18 is made of a coarse wire mesh type, but other materials may be used. The pulleys 20 and 22 are adapted for driving and tracking the conveyor belt 18.

EMBODIMENT OF FIG. 2

Figure 2:
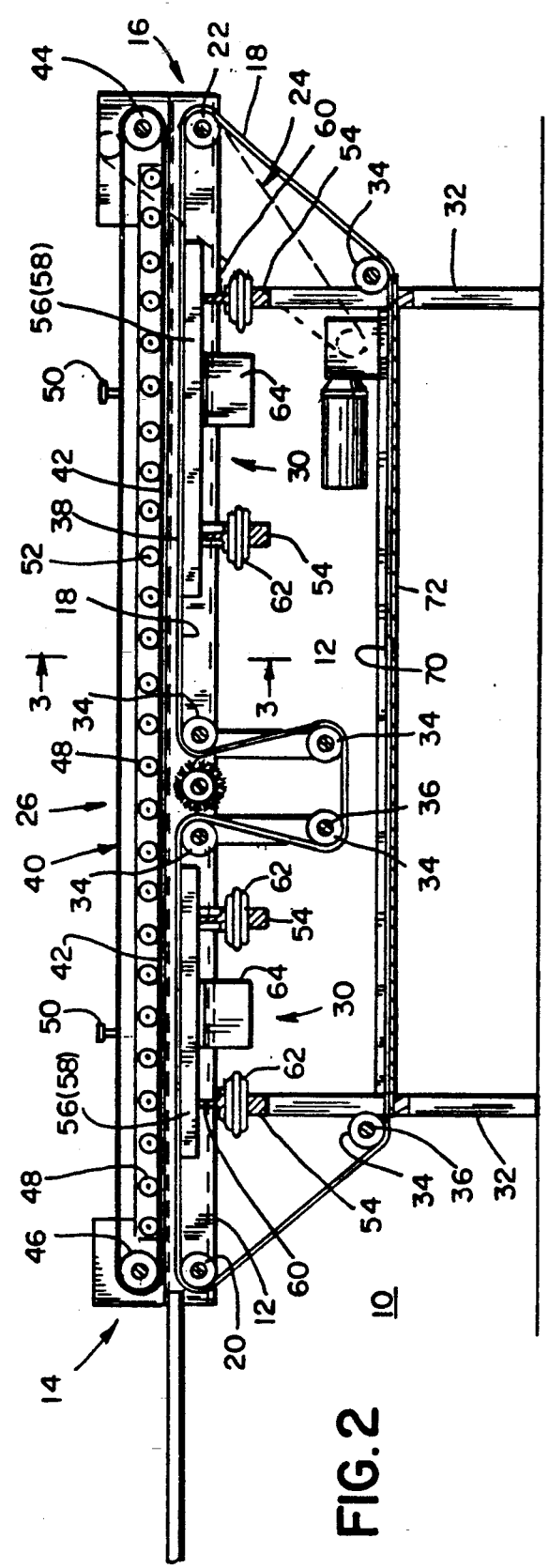
FIG. 2 represents a sectional view, partly schematic, of the present invention when used in a processing facility, this view being taken along line 2—2 of FIG. 1.

FIG. 2 represents the apparatus 10 of the present invention in which the frame 12 is mounted on a plurality of leg members 32. The leg members 32 provide for the free standing installation of the apparatus 10 at a sod processing center which is remote from the sod harvesting site. The leg members 32 raise the surface of the conveyor belt 18 to a convenient working height. The leg members 32 are suitably braced and reinforced to provide a safe installation. The bracing and reinforcement are not shown.

The conveyor belt 18 is directed in a endless path by idler rollers 34. These idler rollers 34 are rotatably journaled on shafts 36. The shafts 36 are mounted to the frame 12. The path of the sod carrying surface 38 of the conveyor belt 18 is directed around the brush assembly 26 in a serpentine manner. This serpentine arrangement provides for a multi-stage sod cleaning apparatus.

The carrying surface 38 of the conveyor belt 18 near the feeding end 14 is supported by the conveyor belt support assembly 30. The carrying surface 38 of the conveyor belt 18 near the discharging end 16 is supported by a second conveyor belt support assembly 30. As previously mentioned each of the conveyor support assemblies 30 are suspended from the frame 12 to allow independent vibratory motion. This vibratory motion is in turn transmitted into the carrying surface 38 of the conveyor belt 18 and any sod being carried thereon. This vibratory motion dislodges the earth or soil from the sod.

It has been found that the use of a brush assembly 26 aids in the removal of the earth or soil from the intertwined roots of the sod. This use of a brush assembly 26 in combination with the vibrating motion of the conveyor belt support assembly 30 removes substantially all of the dirt from the roots of the sod in a shorter conveyed distance than by vibration alone. The brush assembly 26 may be of a rotary type, as shown in FIG. 2, or a transversely reciprocating type, as suggested in FIG. 4. In each type of brush assembly 26 it is preferred that they are powered. The rotary brush assembly 26 should have a peripheral velocity of 1.25 to 1.5 times the velocity of the conveyor belt 18. The power for the rotary brush assembly 26 may be connected to the drive means 24 by a suitable transmission system to insure that the desired velocity ratio is maintained. The brush assembly 26 of course must be capable of contacting substantially the full width of the earth side of the sod being cleaned.

Still referring to FIG. 2, an endless keeper belt assembly 40 extends from the feeding end 14 to the discharging end 16 of the apparatus. The belt 42 of this keeper belt assembly 40 is also of a substantially endless type and has a velocity substantially similar to the conveyor belt assembly 18. This keeper belt assembly 40 includes a drive roller 44, a tail roller 46, and a plurality of support rollers 48. The keeper belt assembly 40 is adjustably mounted to the frame 12 to vary the space between the carrying surface 38 and the keeper belt 42, more clearly seen in FIG. 3.

EMBODIMENT OF FIG. 3

Figure 3:
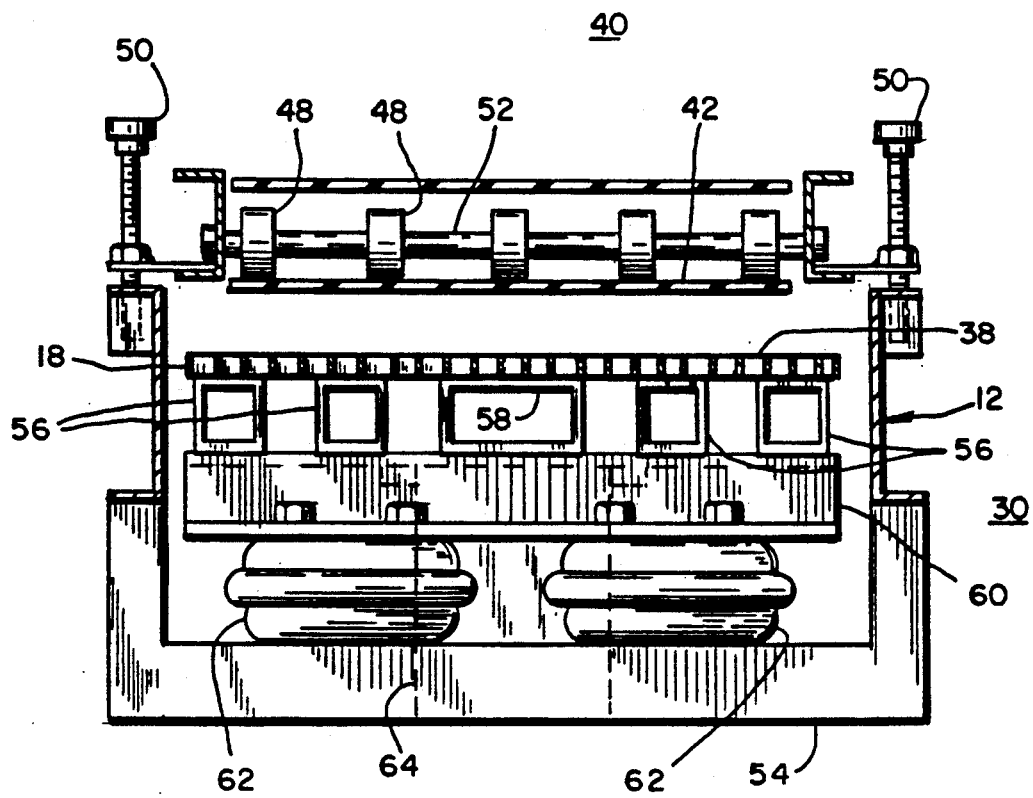
FIG. 3 represents a cross-sectional view of the present invention, this view being a substantially typical arrangement of the conveyor belt support assembly of the present invention.

Referring now to FIG. 3, the keeper conveyor assembly 40 is mounted to the frame 12 by a plurality of adjusting screws 50. It has been found that a minimum of four adjusting screws 50 provide the necessary adjustable stability. The space between the bottom strand of the keeper belt 42 and the carrying surface 38 may be varied by rotating the adjusting screws 50 in a clockwise or counter clock-wise rotation. The support rollers 48 are rotatably carried on a shaft 52. The support rollers 48 preferably are individual wheel-like members as shown but elongated rollers may be used.

The conveyor belt support assembly 30 is mounted to transverse bracket members 54 of the frame 12. This conveyor belt support assembly 30 includes a plurality of elongated tubular rail members 56, a center rail member 58, a pair of tie members 60, a plurality of suspension members 62, and a vibrator means 64.

The pair of tie members 60 are attached to the elongated rails 56 and 58 to provide a selected substantially parallel spacing between each of the rail members 56 and 58. Preferably the tie members 60 are attached to the rail members 56 and 58 to provide a spacing of 3.81 cm. (1.5 in.). This spacing of the rails allows the earth removed by vibration to fall therethrough.

The suspension members 62 are preferably mounted in pairs between each of the transverse bracket members 54 and their associated tie members 60. These suspension members 62 generally are of the compressed air type, such as those commercially available by Goodyear ®. Each of these pneumatic suspension members 62 is inflated between 6 and 9 PSIG. The pneumatic suspension members 62 are preferred due to their inherent stabilizing design as well as vibration isolating properties.

The vibrating means 64 is mounted to the conveyor support assembly 30 to provide vibratory oscillating motion in a substantially vertical plane as well as in a plane parallel to the direction of the sod travel. The vibrating means 64 preferably is capable of variable output. This variable output may provide a gentle vibration of the sod or a very vigorous vibration of the sod. When a vigorous vibration of the sod is required then the keeper belt assembly 40 controls the lifting of the sod from the carrying surface 38 of the vibrating conveyor belt 18. When a gentile vibration is used the keeper belt assembly may not be required.

EMBODIMENT OF FIG. 4

As previously mentioned, the present invention is adaptable for mobile mounting. This mobile mounting may take the form of direct mounting under a farm tractor 66, shown in dashed outline. Preferably this sod cleaning apparatus 110 is mounted immediately after a sod cutting attachement, not shown, which is also mounted to the tractor 66. This particular arrangement discloses a brush assembly 126 mounted at the discharging end 116 of the apparatus 110. The brush assembly utilized may be of the rotary type 26 or of the reciprocating type 126. As previously mentioned the brush assemblies are to be powered. The power for driving the conveyor belts 18 and 42, and the vibrator 64 is provided by an hydraulic pump which may be mounted on the tractor.

This mobile apparatus 110 includes substantially all of the components of the fixed apparatus 10. One advantage of this sod cleaner apparatus 110 is that the dirt removed, may be immediately returned to the sod growing area in a substantially dry condition. The sod absent the dirt is lighter in weight and smaller in bulk which of course translates into a more efficient sod harvesting operation.

This sod cleaning apparatus 110 is also adapted for handling sod widths up to 1.22 meters (48 in.). It has been found that multiple conveyor belt support systems 30 should be used when the sod width is greater that 0.47 meters (18 in.). Each of the conveyor support assemblies 30 would be complete assemblies including their individual suspension systems 62 and vibrator 64.

The lengths of sod are carried up the inclined surface at the feeding end 114 of the apparatus 110. After cleaning by the combination of vibration and brushing the sod is delivered from the discharging end 116 to a sod rolling device, not shown.

EMBODIMENT OF FIG. 5

This alternate mobile sod cleaning attachment for a tractor 66 is generally identified as 210. This mobile sod cleaner 210 is characterized as having an additional conveyor support assembly 30 provided after the brush assembly 26. This sod cleaning apparatus 210 cleans the strip of sod by a first vibrating stage or position, followed by a brushing stage or position, and a second vibrating stage or position. This sod cleaning apparatus 210 may be powered hydraulically, pneumatically, or electrically. The type of power used is dependent on the power generating means on the tractor.

This sod cleaning apparatus 210 is further characterized as having the final vibrating stage arrayed at an incline to the ground. This incline brings the cleaned sod from a harvesting height 214 to a discharging height 216 which is convenient for rolling by auxiliary equipment. The keeper belt assembly 40 is used to control the lifting of the sod during cleaning since a vigorous vibration is used to clean the sod.

EMBODIMENT OF FIG. 6

Figure 6:
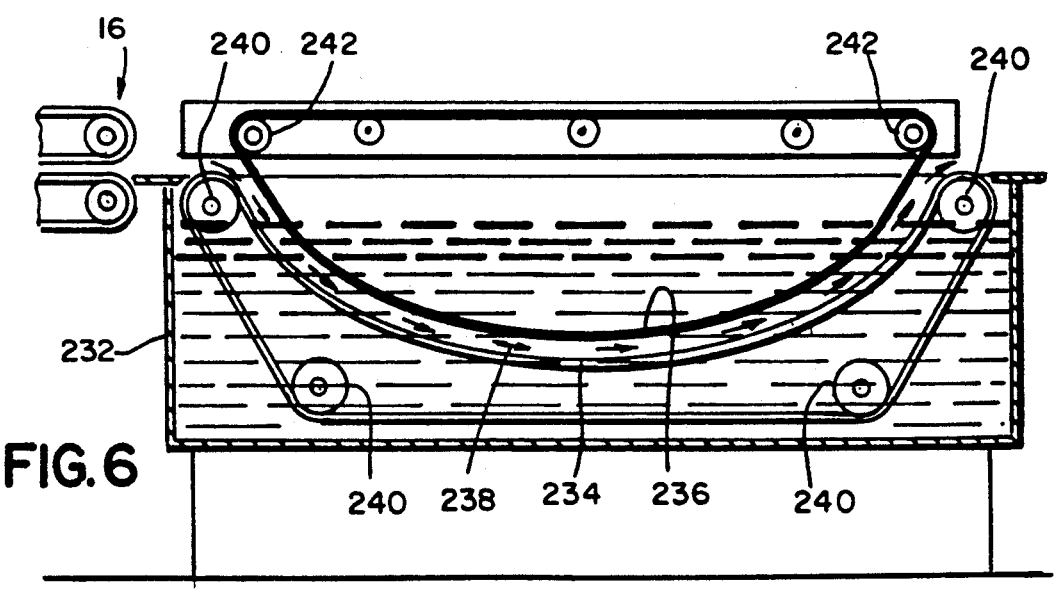
FIG. 6 represents a sectional view of another stage of the present invention, this view being partly diagrammatic and showing a water bath assembly.

Referring now to FIG. 6, a bath assembly, generally identified as 230, which is adapted for removing earth dust from the cleaned sod. The sod is delivered from the discharge end 16 of sod cleaning apparatus 10 to the bath assembly 230. The bath assembly 230 includes a tank 232, a lower supporting belt 234, and an upper guiding belt 236. The lower support belt 234 and upper guiding belt 236 preferably are of the wire mesh type, but other perforate endless belting may be used. The path 238, indicated by the arrow, for the sod between the upper belt 236 and the lower belt 234 is a substantially catenary path. Each of the belts 234 and 236 are driven at a like velocity. The lower support belt 234 is guided around a plurality of rollers, wheels, and the like 240. The upper belt 236 is transported by a plurality of rollers 242.

The tank is filled with a liquid such as water. The water preferably is recirculated through a filter/pump system to clean any unwanted contaminants therein. This bath removes any dust that may have become deposited on the blades of grass during the previous sod cleaning process at apparatus 10, 110, or 210. It should be noted that the amount of dust removed is for cosmetic purpose only, when specified by an installer.

USE AND OPERATION

The cleaning apparatus 10, 110, and 210 use at least one vibrating conveyor support assembly 30 and one brush assembly 26 or 126 to clean the earth side of a length of sod. The sod is placed on the carrying surface 38 of the perforate belt 18. The sod is cleaned as it is transported from the feeding end 14 to the discharging end 16 by the combination of vibrating and brushing.

The earth that is removed from the sod may be handled in various ways. Referring now to FIG. 1, the lower returning strand 70 of the belt 18 is supported by a pan 72. The pan 72 preferably is U-shaped with upwardly extending side members. This U-shaped pan 72 is adapted for collecting the earth removed from the sod. The sweeping-like action of the returning strand 70 of the belt 18 tends to carry the fallen and contained earth toward the feeding end 14 of the apparatus 10. The dirt may be collected at the feeding end 14 or it may be transported by a conveyor, not shown, to another site for reclaiming.

This type of collection system may be employed also in connection with apparatus 110 or 210 should there be a desire to distribute the earth to other parts of the sod farm.

The brush assembly may be located at any point on the apparatus. It has been found that excellent results have been attained by mounting the brush assembly intermediate the feeding end 14 and the discharging end 16.

The drive means 24 and the vibrating means 64 have a variable output. The power source may be electric, hydraulic, and/or pneumatic or a combination thereof. The suspension members 62 preferably are air springs or bags but other types of vibration isolators may be used.

The keeper belt 42 of the keeper belt assembly 40 has been shown as a single belt spanning the width of the apparatus but a series of round or rectilinear belts may be used as an alternate.

Figure 5:
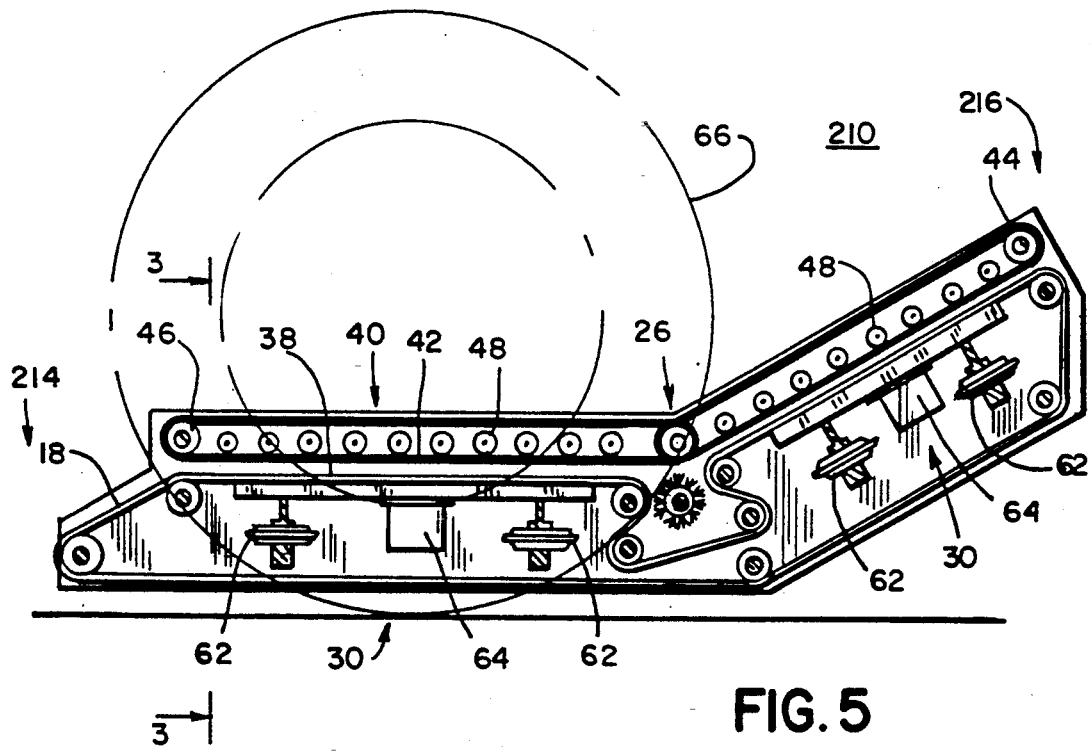
FIG. 5 represents an alternate embodiment for mobile mounting of the present invention, this view being partly schematic and showing three stages of a mobile sod cleaning apparatus.

It is anticipated that a spray of water may be substituted for the final bath shown in FIG. 5. Of course the final stage of the sod cleaning may include a combination bath and spray to remove dust from the sod.

The mobile apparatus 110 and 210 may be provided with at least a pair of wheels mounted on a single axle. This type of arrangement would allow the sod cleaning apparatus to be trailed behind a farm vehicle when desired.

The apparatus of the present invention and its use also suggests a method of cleaning earth from sod which includes the steps of:

transporting an elongated length of sod from a feeding end to discharging end of a conveyor by carrying said sod on a substantially endless moving conveyor belt, said belt being perforate;

dislodging and removing said earth from the earth side of said sod by vibrating at least one conveyor support assembly with said conveyor belt and sod thereon;

combing the earth side of said sod by contacting the earthside of said sod with a brush assembly, said brush assembly being mounted to an apparatus frame;

limiting the lifting extent of the vibrating sod by a keeper conveyor assembly, said keeper conveyor assembly being adjustably mounted to said apparatus frame to provide a selected clearance between a carrying surface of said conveyor belt and said keeper belt assembly.

removing any dust from said cleaned sod by transporting said sod through a liquid bath.

Terms such as "left", "right", "up", "down", "bottom", "top", "front", "back", "in", "out", and the like are applicable to the embodiments shown and described in conjunction with the drawings. These terms are merely for the purpose of description and do not necessarily apply to the position in which the sod cleaning apparatus of the present invention may be utilized.

While a particular embodiment of a sod cleaning apparatus has been shown and described, it is to be understood that the invention is not limited thereto and protection is sought to the broadest extent the prior art allows.

What is claimed is:

1. A sod cleaning apparatus for removing earth from the earth side of sod strips being transported thereon, said apparatus comprising:
   a) an elongated rigid frame including a feeding end and a discharging end;
   b) a conveyor belt being movably carried on said elongated rigid frame, said conveyor belt being perforate and adapted for substantially endless movement from said feeding end to said discharging end, said conveyor belt being adapted to support any sod strip being transported thereon;
   c) at least one conveyor belt support assembly being mounted interior of said elongated rigid frame and intermediate said feeding end and discharging end, each of said conveyor belt support assemblies being suspended on said elongated rigid frame for allowing independent vibratory motion;
   d) at least one vibrating means carried on each conveyor belt support assembly, said vibratory means adapted for providing said vibratory motion;
   e) a brush assembly being powered and selectively positioned on said elongated rigid frame, said brush assembly being adapted for selectively contacting the earth side of the sod;
   f) a drive means adapted for providing said movement of said conveyor belt at a selected rate;
   (g) a keeper belt assembly, said keeper belt assembly being carried on said elongated frame, said keeper belt having a selected portion of its length in substantially parallel alignment with a determined portion of said conveyor belt and being adapted for limiting the lifting of the transported sod during removal of the earth;
   (h) an adjustable mounting means for said keeper belt assembly, said adjustable mounting means adapted for providing a selected spacing between said keeper belt assembly and said sod carrying surface of said conveyor belt; and
   wherein said vibratory motion of each conveyor belt support assembly with said conveyor belt moving thereon in combination with the powered action of the brush assembly providing the removal of the earth from the transported sod strip.

2. An apparatus as recited in claim 1 wherein said elongated rigid frame further includes a plurality of leg members, said leg members providing a substantially free standing apparatus.

3. An apparatus as recited in claim 2 wherein said conveyor belt is a wire mesh type, adapted for allowing removed earth to fall therethrough.

4. An apparatus as recited in claim 2 wherein said vibrator means is adjustably variable for producing a desired amount of vibratory motion.

5. An apparatus as recited in claim 2 wherein each conveyor belt support assembly is suspended on said elongated rigid frame by and with a plurality of pneumatic spring members.

6. An apparatus as recited in claim 2 wherein said brush assembly includes an elongated rotary brush member, said elongated rotary brush member being journaled in said elongated rigid frame, said rotary brush member being rotated at a selected rate while selectively contacting said earth side.

7. An apparatus as recited in claim 2 wherein said brush assembly is adapted for powered reciprocal motion in a direction transverse to the transported direction of said sod.

8. An apparatus as recited in claim 2 wherein a first of said conveyor belt support assemblies being positioned adjacent said feeding end, and a second of said conveyor belt support assemblies being positioned adjacent said discharge end, and said brush assembly being linearly positioned between said first of said conveyor belt support assemblies and said second of said conveyor belt support assemblies for providing a first vibrating earth removing position, an earth side brushing position, and a second vibrating earth removing position.

9. An apparatus as recited in claim 2 wherein said drive means is adapted for variable output for controlling the velocity of said transported sod.

10. An apparatus as recited in claim 2 which includes a U-shaped pan mounted on said elongated rigid frame, said U-shaped pan being adapted for allowing the earth removed from said sod to fall onto and being contained thereon, said U-shaped pan being further adapted for supporting a returning strand of said conveyor belt moving thereon, said returning strand moving said fallen and contained earth to and towards the feeding end for collection.

11. An apparatus as recited in claim 2 which includes a water bath assembly adjacent to the discharging end, said water bath assembly being adapted for removing dust from sod being transported therethrough.

12. An apparatus as recited in claim 1 wherein said rigid frame is adapted for being transported by a farm vehicle, said apparatus being adapted for use at a sod harvesting site.

13. An apparatus as recited in claim 12 wherein said conveyor belt is a wire mesh type, adapted for allowing removed earth to fall therethrough.

14. An apparatus as recited in claim 12 wherein said vibrator means is adjustably variable for producing a desired amount of vibratory motion.

15. An apparatus as recited in claim 12 wherein each conveyor belt support assembly is suspended on said elongated rigid frame by and with a plurality of pneumatic spring members.

16. An apparatus as recited in claim 12 wherein said brush assembly includes an elongated rotary brush member, said elongated rotary brush member being journaled in said frame, said rotary brush member being rotated at a selected rate while selectively contacting said earth side.

17. An apparatus as recited in claim 12 wherein said brush assembly is adapted for powered reciprocal motion in a direction transverse to the transported direction of said sod.

18. An apparatus as recited in claim 12 wherein a first of said conveyor belt support assemblies being positioned adjacent said feeding end, a second of said conveyor belt support assemblies being positioned adjacent said discharging end, and said brush assembly being linearly positioned between said first of said conveyor belt support assemblies and second of said conveyor belt support assemblies for providing a first vibrating earth removing position, an earth side brushing position, and a second vibrating earth removing position.

19. An apparatus as recited in claim 12 wherein said drive means is adapted for variable output for controlling the velocity of said transported sod.

20. An apparatus as recited in claim 12 which includes a U-shaped pan mounted on said elongated rigid frame, said U-shaped pan being adapted for allowing the earth removed from said sod to fall onto and be contained thereon, said U-shaped pan being further adapted for supporting a returning strand of said conveyor belt moving thereon, said returning strand moving said fallen and contained earth to and towards the feeding end for collection.

21. An apparatus as recited in claim 18 wherein said second of said conveyor support assemblies provides an inclined surface for said conveyor belt carried thereon, said inclined surface providing the transporting of the sod from a low harvesting position to a selected height for discharging from said apparatus.

* * * * *